United States Patent

[11] 3,601,228

| [72] | Inventor | Ahid D. Nashif |
| | | Kettering, Ohio |
| [21] | Appl. No. | 731,340 |
| [22] | Filed | May 22, 1968 |
| [45] | Patented | Aug. 24, 1971 |
| [73] | Assignee | University of Dayton |

[54] RESONANT-BEAM/TUNED DAMPER
13 Claims, 15 Drawing Figs.
[52] U.S. Cl. ................................................. 188/1, 248/358
[51] Int. Cl. ................................................. F16f 7/08
[50] Field of Search ..................................... 188/1 B, 103; 248/358

[56] References Cited
UNITED STATES PATENTS
3,078,971  2/1963  Wallerstein .................. 188/1 (B) X
3,419,111  12/1968  Jones et al. .................. 188/1 B Primary Examiner—Duane A. Reger
Attorney—Anthony D. Cennamo ABSTRACT: This invention relates to a method and means of reducing vibration damage to components or component parts exposed to and having a cylindrical response. Specifically, the invention determines the resonant period of vibration and utilizes a tuned-damping device for shifting the resonance peak of the supporting structure and reducing its amplitude. The tuned-damping device is of the beam type and can be extremely small relative to the component and may actually be integrated therein.

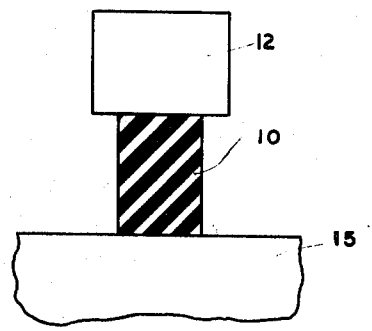
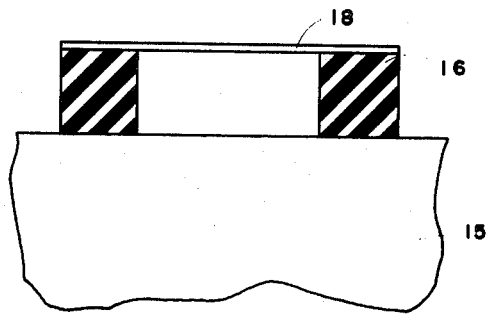
FIG. 1  FIG. 2
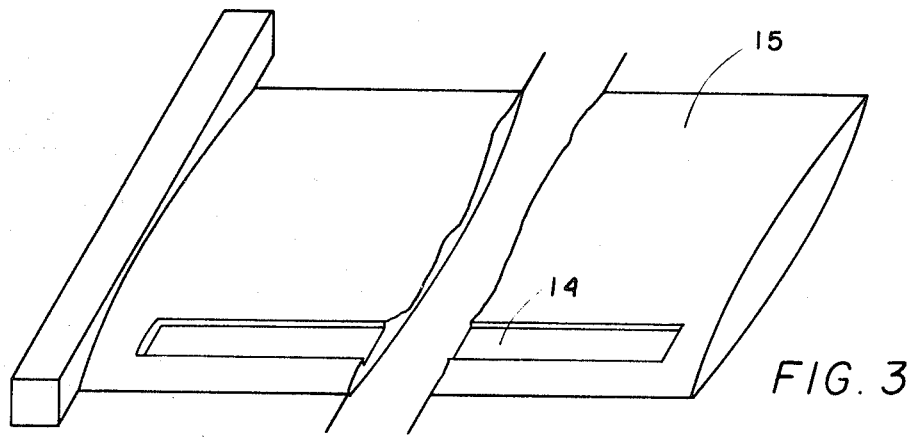
FIG. 3
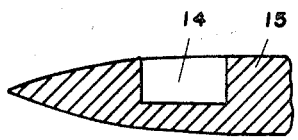
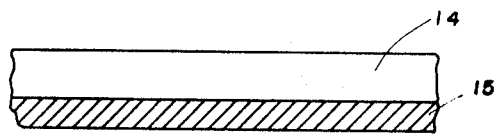
FIG. 3a  FIG. 3b
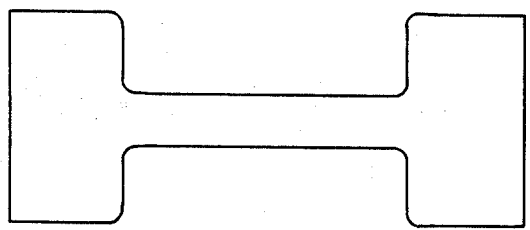
FIG. 7
INVENTOR
AHID D. NASHIF

INVENTOR.
AHID D. NASHIF

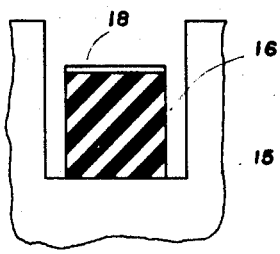
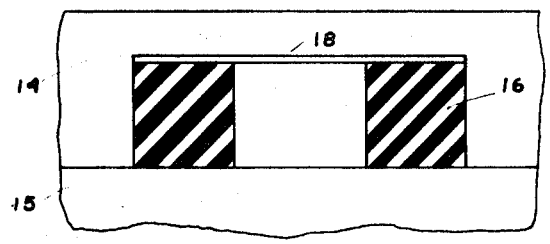
FIG. 4   FIG. 4a
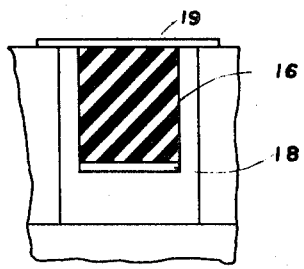
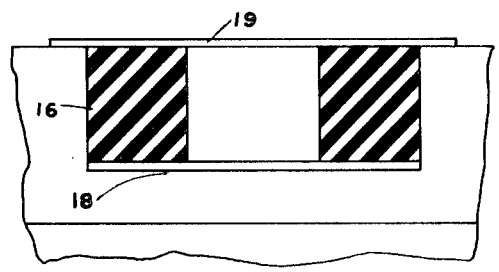
FIG. 5   FIG. 5a
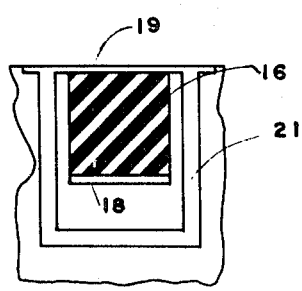
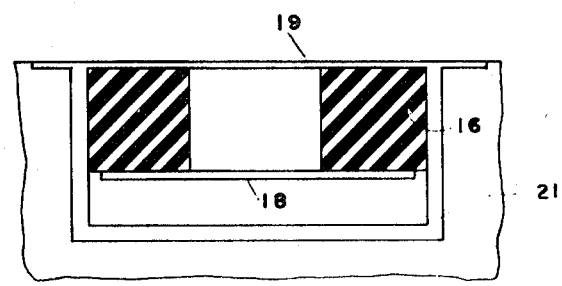
FIG. 6   FIG. 6a
INVENTOR
AHID D. NASHIF
BY
ATTORNEY 3,601,228

RESONANT-BEAM/TUNED DAMPER

BACKGROUND

The prior art discloses many types and forms of devices each intended to reduce or eliminate vibration. In most of these devices the principle utilized is to provide a vibration absorber or an insulator. At best, the effectiveness of these prior art devices is relatively limited.

Among the prior art devices the concept of the tuned vibration absorber or damper has been utilized quite successfully. Basically, the tuned damper comprises a mass suspended on a metal spring; and the overall structure, designed to be tuned in accordance with design parameters, is fixedly positioned on the vibrating component thereby eliminating sharp resonance peaks at specific frequencies. Actually, the sharp resonance peaks are shifted thereby eliminating the objectionable vibration. This type of damper has been further utilized with low-damping rubberlike materials for links in place of the metal springs. The primary function of the low-damping material is to reduce the resonant peaks. Hence, with tuned low-damping material the resonant peaks are shifted and reduced.

More recently prior art devices have been designed utilizing a viscoelastic high-damping material for the link. Results show that the frequency bandwidth—over which these tuned dampers are usable—is far wider than that of the prior-known vibration absorbers. The viscoelastic dampers have been found to be very effective in reducing the vibrational amplitudes in specific types of structures and hence increasing their service life.

Although the viscoelastic damper serves a useful function, it does, nonetheless, rely on the mass principle, that is, mass is required. Accordingly, a tuned viscoelastic damper may not always be utilized in small or compact structures, structures requiring a uniform surface, or structures where weight is a significant factor. Also, a tuned viscoelastic damper cannot be used in structures (such as spacecraft structures) where the weight penalty of the damping treatment is required to be extremely small.

SUMMARY OF INVENTION

The present invention utilizes the tuned damper principle but, unlike the viscoelastic damper which relies only on inertial mass for tuning, utilizes also the flexibility of the beam with, under appropriate choice of design parameters, little sacrifice of efficiency. With the combination of inertial mass and flexibility of the beam, the present invention lends itself to high-damping in very compact and lightweight structures as well as other types of structures exhibiting vibrational problems. More precisely, the present invention utilizes a resonant beam in lieu of the tuned mass. The resonant beam introduces a large deformation in the high-damping viscoelastic material and hence dissipates the vibrational energy as heat. The theoretical and mathematical analysis has been derived for a constructed preferred embodiment that has yielded excellent results.

OBJECTS

It is accordingly a principal object of the present invention to provide a new and improved vibrational damper.

It is a further object of the present invention to provide a new and improved vibrational damper for introducing high-damping in structures that are very compact and lightweight and wherein the damper may be integrated in the surface of the structure.

Another object of this invention is to achieve as good a damping as can be obtained with the prior art tuned viscoelastic dampers but for considerably less weight penalty in a variety of structures such as beams, plates, panels, multispan structures, etc.

Other objects and features of the present invention will become apparent from the following detailed description when taken in conjunction with the drawings in which:

BRIEF DESCRIPTION OF THE DRAWINGS

FIG. 1 is a schematic illustration of a tuned viscoelastic damper of the prior art;

FIG. 2 is a schematic illustration of a resonant-beam/tuned damper of the present invention;

FIG. 3 is a mechanical schematic illustration, in perspective, of a compressor blade adapted to have the tuned damper of the present invention integrated therein;

FIG. 3a is a cross section view, and

FIG. 3b is a longitudinal view of the structure of FIG. 3;

FIG. 4 is a cross-sectional view, and

FIG. 4a is a longitudinal view of the tuned damper incorporated in the structure of FIG. 3;

FIG. 5 is a first alternative resonant cross-sectional view, and

FIG. 5a is a longitudinal view of a beam-tuned damper of the present invention incorporated in the structure shown in FIG. 3;

FIG. 6 is another alternative longitudinal illustration of a resonant-beam/tuned damper of the present invention having the resonant beam encapsulated in the vibrating structure of FIG. 3, and FIG. 6a is a cross-sectional view of the structure of FIG. 6;

FIG. 7 is still another alternative embodiment of the resonant beam of the present invention; and, FIG. 8 is a schematic illustration of resonant-beam/tuned dampers of the present invention on a typical aerospace structure of the skin-stringer type.

DETAILED DESCRIPTION OF THE DRAWINGS

Figure 8:
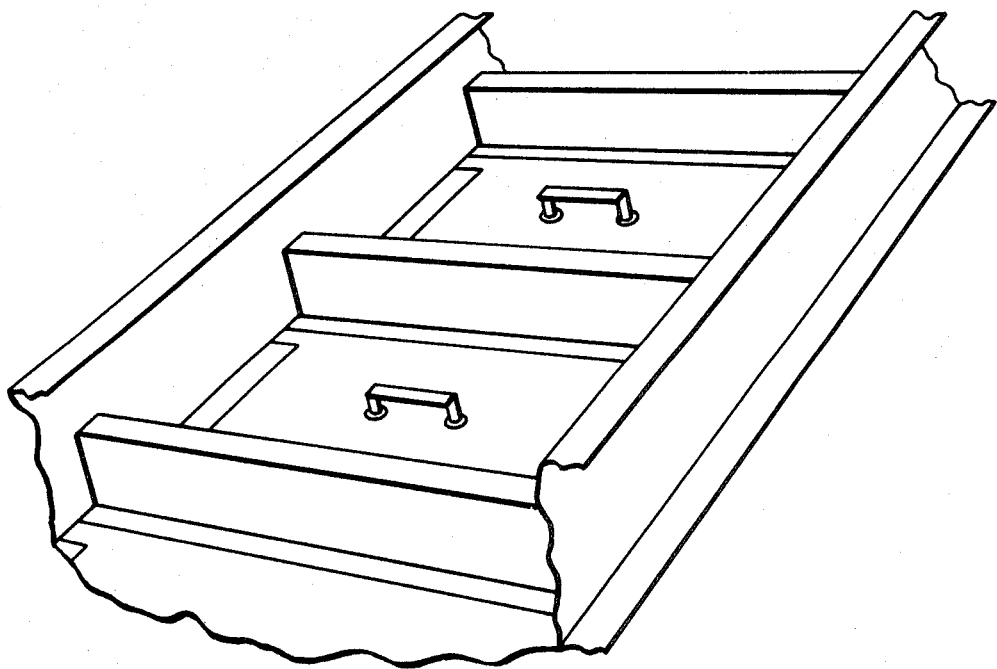

With reference to FIG. 1 there is shown a schematic illustration of a viscoelastic damper of the prior art. The structure shown, viscoelastic material 10 and the mass 12 fixedly positioned on a vibrating element 15, is of the mass-damper type. This viscoelastic/tuned-damper together with other types of viscoelastic dampers such as the cantilever, are described in a publication of the AIAA Journal Volume 5 No. 2 pages 310–315. Further, the mathematical analysis of the viscoelastic-mass/tuned-damper for overcoming vibration is also given in that publication.

As can be seen from FIG. 1 the viscoelastic/tuned-damper is of the external mass type, that is, the mass 12 protrudes from the main body of a vibrating element 15. One specific application where such a tuned-damper has been successful in eliminating vibration is in an aircraft antenna. Unfortunately, however, all vibration problems are not found in as simple a structure as an antenna. Many structures suffer severe vibrations where the structure is small, compact, lightweight and of most importance is under continuous movement. It is seen, therefore, that a very small mass under constant rotation or movement must not be effected in its natural performance by the addition of protruding masses. In these instances the mass-tuned damper of FIG. 1 is not adaptable.

Other structures which are subjected to vibrational environments may require damping devices with extremely low weight penalty (such as in aerospace and spacecraft structures) and here again the conventional tuned viscoelastic damper becomes less advantageous because of its inertial mass.

With reference to FIG. 2 there is illustrated a simple schematic of a resonant-beam/tuned damper of the present invention comprising a resonant beam 18 and a viscoelastic material 16 fixedly positioned on a vibrating element 15. This device has the advantage of relying on the interaction between the beam stiffness and the link stiffness alone for a given mass as for the conventional tuned viscoelastic damper, so that a size and weight reduction potential exist.

In theory of operation, with the resonant beam 18 together with the viscoelastic link 16 tuned to a given mode, or group of modes, of the vibrating structure the beam will resonate. In this way the resonant beam 18 introduces a large deformation in the high-damping viscoelastic material 16; this, in turn, dissipates the vibrational energy to reduce the vibrational amplitudes of the structure 15.

The introduction of the resonant beam shifts the resonant frequency of the vibrating member. In addition, the viscoelastic material damps, i.e., reduces the amplitude of the vibration of the vibrating member.

The natural frequency $\omega_D$ of the resonant-beam/tuned damper is given by:

$$\omega_D^2 = \frac{\xi^4 \Gamma EI}{\mu l^4 (1+\Gamma)}$$

where:
 $\omega_D$ is the natural frequency of the resonant-beam/tuned damper (rad/sec.)
 $\xi$ is the first eigenvalue appropriate to beam geometry
 $\Gamma = (kl^3)/(8\pi^2 EI)$ is a stiffness parameter
 $l$ is the length of the beam (in.)
 $k$ is the real part of link stiffness (lb./in.)
 $E$ is Young's Modulus of the beam material (p.s.i.)
 $I$ is the second moment of area of beam cross section (in.$^4$)
 $\mu$ is the mass per unit length of the beam (slugs/in.)

It should be emphasized here that in order to obtain a wide frequency bandwidth, over which the resonant-beam/tuned damper can operate most effectively, it is necessary to have a high-damping viscoelastic material (a loss factor of 0.2 or more) and to have the stiffness parameter $\Gamma$ (which is a function of the geometry of the device) of the order of unit or less.

The resonant-beam/tuned damper of the present invention, because of its uniqueness in structural design, is very compact and is operative very effectively as a vibration damper with only a minimum of weight penalty. In a first practical embodiment of the present invention, the resonant beam damper was integrated in a compressor blade 15 such as that shown in FIG. 3.

The compressor blade 15 was chosen since high-speed blades are subjected to severe vibrational environments. In the first preferred embodiment an experimental slot 14 was used in the blade 15 as shown in FIG. 3 and shown in cross section in FIG. 3a and longitudinally in FIG. 3b. The slot 14 was longitudinal or along the major axis of the blade. The blade 15 was subjected to a cyclic loading and its period of vibration was determined. A resonant-beam/tuned damper was designed in accordance with the above equation and experimentally tested to match its period of resonance to the first torsional mode of vibration of the compressor blade. The resonant-beam/tuned damper was fixedly positioned in the slot 14 of the blade 15 as shown in FIGS. 4 and 4a.

The actual physical size of the tuned-damper was considerably smaller than the slot 14 as shown. The damper was positioned at the end of the slot where maximum vibration occurred.

Vibrational tests of the constructed preferred embodiment indicated that amplitude reductions of an order of magnitude were achieved when the resonant-beam/tuned damper was placed in the slot 14 near the tip of the blade 15. The dimensions of the tuned damper were only 2.5 inches × 0.25 inches × 0.078 inches and the weight was only 0.8 g. which is less than 0.1 percent of the weight of the blade 15. The viscoelastic material was a high-damping material such as General Electric RTV116 with an adhesive for retention in the slot 14.

The feature of the resonant-beam/tuned damper is that it can be made small in size and light in weight and still introduce high-damping into vibrating structures. The advantage is achieved by the concept that makes use of a thin beam for tuning purposes instead of a mass as in the conventional tuned dampers.

With reference to FIG. 5 a cross section end view and FIG. 5a a cross-sectional longitudinal view, there is shown a first alternative arrangement for integrating the resonant-beam/tuned damper into a structure 15, such as, a compressor blade. As seen, the resonant-beam damper is inverted—with the beam 18 positioned downwardly relative to the slot 14. Across the top of the slot 14 and formed with the high-damping viscoelastic material is a thin metal outer sheet 19 that in turn supports and maintains the resonant beam in place.

A further refinement of an integrated resonant-beam damper is shown in the cross-sectional end view of FIG. 6 and the cross-sectional longitudinal view of FIG. 6a.

In this embodiment the resonant-beam/tuned damper is encapsulated in capsule 21 and integrally positioned in the slot 14 of blade 15. As shown in FIG. 6 and 6a the viscoelastic material 16 with the beam 18 is similar to that of FIG. 5 and 5a; however, the viscoelastic material 16 may be placed on both sides of the beam 18 to increase its stiffening, and its load carrying area.

In certain designs and applications it may be desirable to increase the load-carrying area of the viscoelastic material by other means. One manner in which this may be achieved is to increase the surface of the beam at the ends engaging the viscoelastic material as shown in FIG. 7.

Figure 2A:
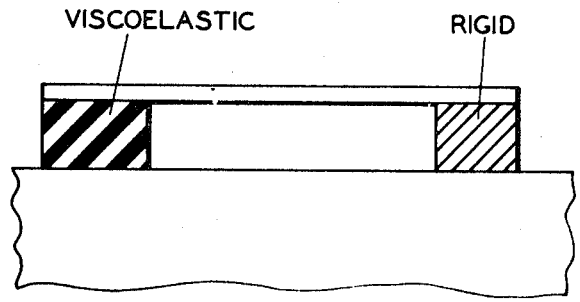
FIG. 2a is a first alternative arrangement of the preferred embodiment of FIG. 2.

It might also be advantageous to anchor one end of the beam to the structure and have the viscoelastic material on the other side only. In this manner, as shown in FIG. 2a, the resonant-beam/tuned damper will operate effectively under high centrifugal force fields.

Further, multispan resonant-beam dampers may be utilized in the arrangements of FIGS. 5 and 6 to increase the effectiveness of the frequency range.

Figure 2B:
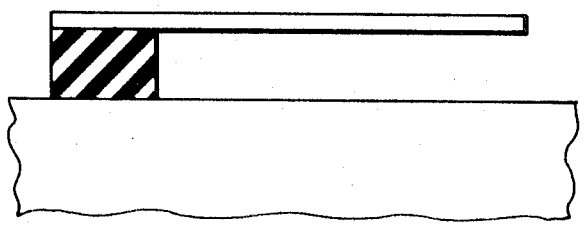
FIG. 2b is another alternative arrangement of the preferred embodiment of FIG. 2.

A cantilever version of the damper may also be utilized in order to achieve a lower frequency for the damping device. This can be accomplished, as shown in FIG. 2b, by having the flexible beam supported on the vibrating structure with only one link of viscoelastic material.

As another application of the preferred embodiment, the resonant-beam/tuned damper was applied to an entirely different structure than that of the compressor blade in order to demonstrate the wide variety of applications wherein this damper can be used effectively. In this instance the structure was a typical aerospace structure of the skin-stringer type that exhibited a multimodal response. Resonant-beam/tuned dampers were designed and built in accordance with the previous formulas to operate over a given frequency bandwidth of the structure from approximately 50 c.p.s. to 150 c.p.s. Under acoustical excitation of 151 db. the resonant-beam/tuned dampers reduced the amplitude of vibration of the structure by up to 9 db. over the given frequency bandwidth. The weight penalty in this case was only 1.5 percent.

Thus it has been demonstrated that the resonant-beam/tuned dampers are very effective in reducing the vibrational amplitude of large structures for a small weight penalty and over a wide frequency bandwidth.

Although certain and specific embodiments have been illustrated, it is to be understood that modifications may be made without departing from the true spirit and scope of the invention.

What is claimed is:

1. Apparatus for reducing the vibration in a structure comprising: a flexible resonant beam of a size and weight relatively small to said structure, viscoelastic means for supporting said beam on said structure, said viscoelastic member bonded to said beam and said structure, said resonant beam and said viscoelastic means together tuned to the frequency of vibration of said structure, wherein said resonant beam and said viscoelastic means shifts the resonant peak of vibration of said structure and reduces the amplitude of said resonant peak.

2. Apparatus as set forth in claim 1 wherein said resonant beam damper system is defined by:

$$\omega_D^2 = \frac{\xi^4 \Gamma EI}{\mu l^4 (1+\Gamma)}$$

where:
 $\omega_D$ is the natural frequency of the resonant-beam/tuned damper (rad/sec.)

$\xi$ is the eigenvalue appropriate to beam geometry
$\Gamma=(kl^3)/(8^2 EI)$ is a stiffness parameter
$k$ is the real part of link stiffness (lb./in.)
$l$ is the length of the beam (in.)
$E$ is Young's Modulus of the beam material (p.s.i.) $I$ is the second moment of area of beam cross section (in.⁴)
$\mu$ is the mass per unit length of the beam (slugs/in.)

3. Apparatus as set forth in claim 2 wherein said viscoelastic means supports said beam at both ends thereof.

4. Apparatus as set forth in claim 2 wherein said beam is anchored at one end and wherein said viscoelastic means supports said beam at its other end.

5. Apparatus as set forth in claim 2 wherein said viscoelastic means supports said beam at one end thereof.

6. Apparatus as set forth in claim 1 further comprising means for forming a cavity in said structure, and means for fixedly positioning said beam and said viscoelastic member in said cavity.

7. Apparatus as set forth in claim 3 further comprising a thin structural member for enclosing said beam and viscoelastic member in said cavity.

8. Apparatus as set forth in claim 3 wherein said beam and viscoelastic member are encapsulated and said capsule is fixedly positioned in said cavity.

9. Apparatus as set forth in claim 3 for reducing the vibrational amplitudes of structures exhibiting multimodal responses further comprising at least one more resonant beam and viscoelastic support means, and means for positioning on said structure said resonant beam and viscoelastic means.

10. Apparatus as set forth in claim 7 wherein said resonant beams and viscoelastic means are tuned over a range of frequencies to thereby damp the vibration of said structure over a wide range of frequencies.

11. Apparatus as set forth in claim 3 wherein $**=\pi$.

12. Apparatus as set forth in claim 4 wherein $\xi=3.93$.

13. Apparatus as set forth in claim 5 wherein $\xi=3.93$.